UNITED STATES PATENT OFFICE.

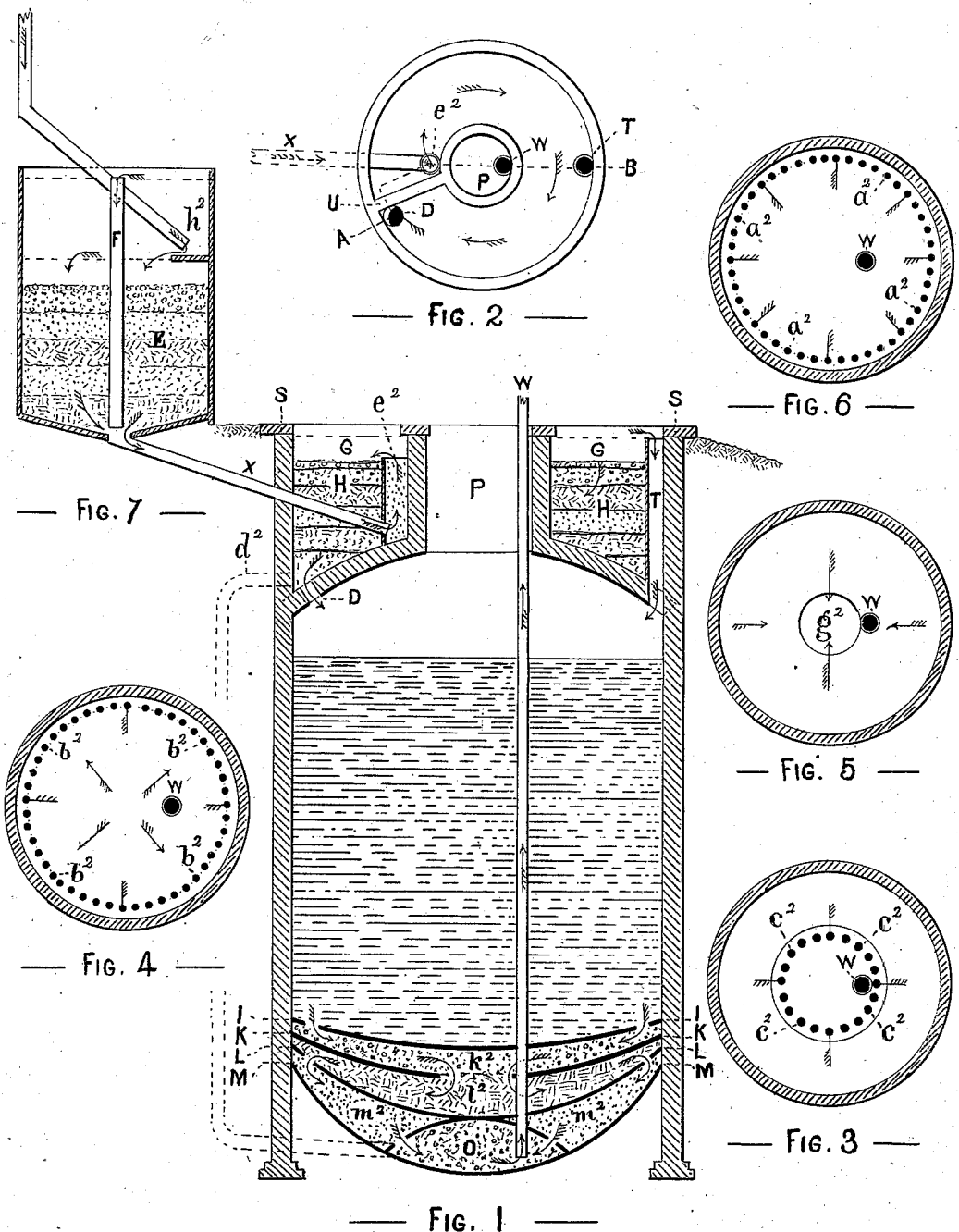

SAMUEL DAY, OF ANN ARBOR, MICHIGAN, ASSIGNOR TO HANNAH E. DAY, OF SAME PLACE.

CISTERN-FILTER.

SPECIFICATION forming part of Letters Patent No. 231,771, dated August 31, 1880.

Application filed December 9, 1879.

*To all whom it may concern:*

Be it known that I, SAMUEL DAY, of the city of Ann Arbor, county of Washtenaw, State of Michigan, have invented a new and useful Improvement in Cistern-Filters, of which the following is a specification.

The invention relates to the construction, location, and composition of the filter, so as to secure in any given cistern-space a more thorough removal of suspended matter than is effected in cistern-filters now used, to eliminate from the water matters most harmful to health, which, being in a liquid or gaseous form, cannot be strained or filtered out, but must be oxidized away, which is done mainly by the concentration of atmospheric oxygen and in part by oxygen dissolved in water, due to adhesive attraction of the internal surfaces of the porous charcoal in the bed for the oxygen of the atmosphere.

The process of oxidation is carried on during the passage of the water through a finely porous and aerated filter-bed, the aeration of which takes place during fair weather. The filter-bed, drying out, becomes aerated to a degree it could not if submerged, and is thereby more thoroughly cleansed by the oxidation of the organic matters which the bed had taken from the water during rainy weather.

The filter-bed in which the oxidation and aeration take place is not constantly submerged, as are those now used, but is open to air-pressure, to the action of light and heat in summer, and to the disinfecting, cleansing, and healthful influence of cold and frost in winter, agencies essential to secure good water.

A tonic or mineral quality can be given to the water by the introduction of iron-filings or small scraps of iron in the filter-bed, when desirable.

In the accompanying drawings, similar letters and figures indicate similar parts.

Figure 1 is a vertical section of filter with its walls extending from base of arch to ground surface. It has on its arch a main aerated filter-bed, and on its bottom four more filter-beds. In the main aerated filter-bed H H there are six layers, as follows: First, gravel stones or pebbles at the bottom, to allow free drainage; second, a layer of coarse gravel; third, one of finer gravel; fourth, one of sand; fifth, one of coarsely-granulated charcoal and fine sand; sixth, one of small pebbles on top, to keep charcoal in place and allow it to dry out between showers in fair weather. G G is a space for water above filter-bed H H; T, an overflow-pipe, with top below outer cistern-wall, to take water not passing through the main filter by a direct passage into the cistern; $e^2$, a pipe to allow water discharged from conduit-pipe X, Fig. 7, to come from main aerated filter-bed to its surface, and then spread over it; D, an opening to carry the water into the cistern after it has passed through the filter-bed H H in a circuit around the man-hole P. The arrangement and composition of the four (4) filter-beds on the bottom of the cistern are as follows: O is a hemispheroidal filter on bottom of cistern, composed of granulated granite, or limestone, if desirable, or cleanly-washed pebble-stones. This is gravel concreted an inch thick, and perforated, before concrete sets, with twenty-five to fifty small holes, $c^2$ $c^2$ $c^2$ $c^2$, midway between its base and top, as shown in Fig. 3. $m^2 m^2$ is a filter-bed around O, made of coarse gravel and gravel concreted in form of an inverted arch, with fifty to seventy-five small holes, $b^2 b^2 b^2 b^2$, near its outer edge, as shown in Fig. 4; $l^2$, a filter-bed above $m^2 m^2$, made of fine gravel and gravel concreted in form of an inverted arch, with a twelve-inch opening, $g^2$, as shown in Fig. 5. $k^2$ is a filter-bed above $l^2$, of closely-compacted clean and sharp sand, and concreted with gravel an inch or more in thickness, with fifty to seventy-five small holes, $a^2$ $a^2$ $a^2$ $a^2$, near its outer edge, as shown in Fig. 6.

Fig. 2 is top of cistern. Its several parts are as follows: U is a four-inch wall of brick, filling space between man-hole P and the outer wall of cistern. Its use is to compel water coming into main aerated filter on its left side to pass around man-hole P before entering cistern through opening D; X, a conduit-pipe, laid below frost, conducting water from receiving-reservoir fountain-filter, Fig. 7, to main aerated filter bed on the arch; $e^2$, a point on left side of partition-wall U, where water is discharged from conduit-pipe X into main filter bed or arch; T, top of overflow-pipe for surplus water; D, entrance from main aerated filter bed on arch into cistern.

Fig. 7 is a receiving-reservoir fountain-filter, with its bottom on a level or at any point above top of cistern-wall. Its several parts are as follows: $h^2$ is a leader discharging water from roof into this filter on a flat stone; E, a filter-bed, first, of small pebbles or gravel-stones, to allow free drainage; second, very coarse gravel and charcoal mixed; and, third, a layer of small pebble or gravel stones on top; F, an overflow-pipe for surplus water; X, conduit-pipe to carry water into main filter bed on arch.

W in Figs. 2, 3, 4, 5, 6 represents pump-stock or pipe leading into hemispheroidal filter O on bottom of cistern.

The arrow-heads, in the several places where they occur, indicate the direction of the water-currents above the concrete over the several filter-beds $k^2$, $l^2$, $m^2$ $m^2$, and O.

The dotted lines on left of Fig. 1 indicate a possible connection direct between main aerated filter bed on arch and the hemispheroidal filter O, should a longer line of filtration be desired, which does not seem necessary. Should such a connection, however, be made it would duplicate the distance through which the water must pass, as with such a connection it would be forced by fountain-head pressure through O, $m^2$ $m^2$, $l^2$, and $k^2$ in horizontally divergent and convergent currents into main cistern, and then, by its own gravity and suction-power of pump, when in action, be drawn back again into hemispheroidal filter O in a reversed order of horizontally convergent and divergent currents, through these several filter-beds into hemispheroidal filter O, where it is drawn and filtered as needed for use.

I claim—

1. In a filter for cisterns, the receiving-reservoir herein described, provided with the filter-bed E, overflow-pipe F, a flat stone beneath the mouth of the feeder $h^2$, to prevent washing of the filter-bed, and the discharge-pipe X, constructed and operating substantially as and for the purposes set forth.

2. In a cistern provided with the herein-described arch and man-hole P, the combination of the filter-bed H, resting upon said arch and surrounding said man-hole, with the radial wall U, pipe $e^2$, overflow-pipe T, water-space G, and the discharge-opening D, constructed and operating substantially as and for the purposes set forth.

3. In a cistern, and located at the bottom of the same, the combined filter-beds O $m^2$ $l^2$ $k^2$, arranged one above the other in the order named, the beds O, $m^2$, and $k^2$ being perforated respectively at $c^2$, $b^2$, and $a^2$, and the bed $l^2$ provided with the opening $g^2$, in combination with the pump W, substantially as and for the purposes set forth.

4. The combination of the filter-bed E, constructed and located on or above the level of the top of the cistern, with the filter-bed H, constructed as described and resting upon the arch of the cistern, for the purpose of permitting aid filter-beds to be aerated when not submerged by a rain-fall, as set forth.

SAMUEL DAY.

Witnesses:
JAMES B. GOTT,
HENRY J. BROWN.